United States Patent [19]

Preisendörfer

[11] Patent Number: 4,871,180

[45] Date of Patent: Oct. 3, 1989

[54] SEAL CONSTRUCTION IN BELL AND SPIGOT TYPE CONCRETE PIPE CONNECTION

[76] Inventor: Gerhard H. Preisendörfer, Theodor-Heuss-Strasse 13, 6056 Heusenstamm, Fed. Rep. of Germany

[21] Appl. No.: 148,065

[22] Filed: Jan. 25, 1988

[30] Foreign Application Priority Data

Jan. 28, 1987 [DE] Fed. Rep. of Germany ....... 3702477

[51] Int. Cl.$^4$ .............................................. F16J 15/00
[52] U.S. Cl. ............................ 277/207 A; 277/207 R; 277/DIG. 2; 285/110; 285/230; 285/345
[58] Field of Search ............... 277/165, 207 R, 207 A, 277/208, DIG. 2; 285/110, 230, 231, 345, 369, DIG. 11

[56] References Cited

U.S. PATENT DOCUMENTS 1,683,076  9/1928  Johnson et al. ............. 277/207 A X

FOREIGN PATENT DOCUMENTS 0016275 10/1980 European Pat. Off. .
2935392  3/1980 Fed. Rep. of Germany .
1260263  1/1972 United Kingdom ........... 277/207 A
1266330  3/1972 United Kingdom ........... 277/207 A

OTHER PUBLICATIONS

Forsheda Rohrdichtungen, "Forsheda 103-Glipp" and 104, Forsheda Company Pamphlets, Sweden, date unspecified, 4 pages.

*Primary Examiner*—Robert S. Ward
*Attorney, Agent, or Firm*—Barnes, Kisselle, Raisch, Choate, Whittemore & Hulbert

[57] ABSTRACT

Production of concrete bell and spigot pipes having a recess (13, 53) in the socket which is relative shallow and is produced using a core (40; 60). The seal (20) made of a relative compact elastomer (16) body may be inserted with its seating portion into the recess (13, 53) at any time after the pipe has been produced. The sealing portion (32) which functions as a combined compression and lip seal has a circular recess of triangular cross section before being pressed together when a pipe system is assembled.

8 Claims, 6 Drawing Sheets

SEAL CONSTRUCTION IN BELL AND SPIGOT TYPE CONCRETE PIPE CONNECTION

This invention relates to concrete bell-and-spigot pipes and particularly to a method of producing a recess in the bell of such pipes.

The invention also refers to seals which are adapted to be inserted into such recess.

Finally, the invention refers to a device enabling the method to be carried out.

BACKGROUND OF THE INVENTION

In order to seal bell-and-spigot type pipe connections on concrete-pipes, a so-called roll-in joint is still generally used in practice. The sealing ring is mounted on the spigot and pushed into the bell together with spigot, causing the ring to roll in until it reaches roughly the center of pipe connection. Uneveness along the rolling paths might impede uniform rolling of the sealing ring causing local distortion and reduction in diameter, which in turn might give rise to leakages. Furthermore, thinned sections of sealing rings have become lengthened and might protrude into the gap at the front face of the spigot with the consequence of total loss of sealing effect.

With sliding joints the seal is backed-off by a shoulder on the spigot as shown in FIG. 2 of European patent application No. 16,275, and a lubricant is used for easing assembly of the pipes and preventing abrasion. A disadvantage arises in certain applications causing the lip to be relieved when the pressure inside the pipeline builds up.

There is also the possibility of fixing the sliding seal in the bell, as shown in German patent application No. 29 35 392, whereby the seal is applied as a permanent insert when the pipe is cast. During production it can happen that water seggregating from the fresh concrete accumulates between the seal and its seat, leaving behind an airpocket after evaporating. After such pipes have been laid for the purpose of conveying fluids, the latter can escape through the pockets, seeping out round the back of the seal. A further disadvantage is the fact that the sealing element material ages if stored for a long time and the avoidable storage of seals ties up capital unnecessarily. Elastomer, though a very effective material for seals, is deleteriously influenced by oxidants, particularly by ozone. Another drawback arises when concrete pipes are being manufactured with constantly deviating dimensions. In that case the integrated seal is either over- or undersized with regard to the seal gap size.

With yet another sliding seal installed in the socket, as shown in FIG. 5 of European patent No. 16,275, the sealing element is provided with a retainer having an extended diameter which is seated in a recess or groove inside the socket. The sealing lip is situated radially opposite to the retainer and faces the fluid to be sealed. Growing internal pressure also increases the radial pressure on the sealing lip. The production of concrete bell-pipes comprising a recess or groove is not described; since reference is made to clay pipes, it is assumed that the groove is pressed into the workable clay prior to burning. This method cannot be adapted to concrete pipes.

Deviations from nominal dimensions frequently occur with concrete pipes. Each batch is either too thick or too thin so that a specific seal size is not sufficient to cover a nominal size range on concrete pipes.

An object of the invention is to find a production method for concrete pipes with which the seal may be mounted in the bell as soon as the concrete-mixture is cured or relatively late, if necessary, immediately prior to pushing the pipe ends together, depending upon the manufacturer's choice.

A further object of the invention is to make it possible to select appropriately sized seals to suit individual batches.

Still a further object is to allow the concrete pipes to be suitable for adapting different types of seals, i.e. sliding joints, roll-in joints.

Concrete pipes are normally cast with the bell at the bottom, whereby "cast" implies any kind of placement and compaction method used in order to charge the mould with concrete. The mould usually comprises a tubular outer mould and a core consisting of a tubular inner wall and a so-called base-ring, herein termed the bell-forming core.

SUMMARY OF INVENTION

In accordance with the invention, the concrete bell-and-spigot pipes are produced with a recess in the bell using a mould which has two sections or parts. The first part of the bell-forming core serves to shape the annular chamber in the bell for accommodating the spigot, and the second part to form the recess for seating the seal. On reaching the initial set, the bell-forming core is withdrawn from the bell exposing the seal recess. (The stability of chuted or green concrete is sufficiently high to maintain its shape, but too low to carry any loads.) During the period after which the concrete has hardened and before the pipes are laid, the appropriate seal is fitted into the recess. At this time, the exact measurements of the pipes originating from one common production batch are known, this applies in particular to the inside diameter of the recess and the outside diameter of the spigot, so that the correct size of seal can be determined to ensure reliable joints along the pipe-line being laid.

The recess shaped by the bell-forming core can equally well accomodate the body or retainer of a specially profiled sliding seal or alternatively the conventional roll-in joint.

The first section of the bell-forming core complies with the conventional base-ring and should preferably be made of steel. The second section of the bell-forming core moulds the recess for the sealing element.

If the transition between this recess and the outer face of the bell is plane and not stepped, both sections of the bell-forming core may remain joined together permanently since in this case both can be withdrawn axially from the pipe-bell as a unit.

However, it is also possible to join the sections of the bell-forming core in such a manner that they may be separated if required. In that case the first section of the bell-forming core can be used as a base-ring for producing conventional concrete bell-and-spigot pipes without recess. The dual purpose core is intended for manufacturers wishing to produce both types of pipes without any need of maintaining a large stock of forming tools.

The recess requiring to be made in a concrete pipe may extend axially to the outer end-face of the bell, in which case it can be regarded as a cylindrical recess terminating in a rounded lead-in zone at the enter face of the bell. An annular undercut shoulder is provided to firmly secure the seal in its position, thus the recess resembles half a dovetailed groove.

But it is also possible to provide a rectangular groove instead of a recess, so that the second section of the bell-forming core can only be withdrawn radially. In this case the first section of the bell-forming core is withdrawn in axial direction followed by the second section which is withdrawn in radial direction. The second section is then made of rubber or a similar flexible and resilient material and, if necessary, might comprise several segments which can be withdrawn separately towards the inside.

As soon as the concrete pipe is dry and hard, the body or retaining part of a seal is fitted or glued into the groove, or clamped with a snap ring. The sealing component protrudes towards the inside of the bell into which the spigot of the mating pipe is pushed to complete the sealing joint. The seal can be a compression and/or lip type seal.

DESCRIPTION

Figure 1:
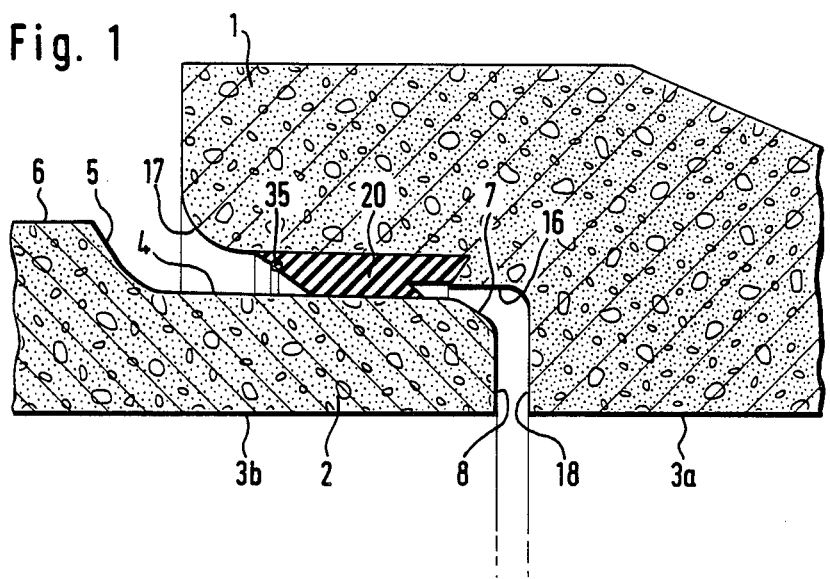
FIG. 1 is a sectional view of a bell-and-spigot pipe joint.

FIG. 1 depicts the novel sealing arrangement for concrete bell-and-spigot pipe joints. Each pipe has a bell-end 1 and a spigot-end 2. The inner surface of the pipe is designated 3a and 3b. The inner radial contours have merely been indicated for illustrating purposes. The spigot-end 2 comprises an outer surface 4 which merges into the nominal outside surface of the concrete pipe via a shoulder 5. The outer end is provided with a lead-in radius or -chamfer 7 and a radial front face 8. The outer surface 4 is cylindrical, but can also be slightly tapered, e.g. taper angle with centre line 1° to 2°.

Figure 2:
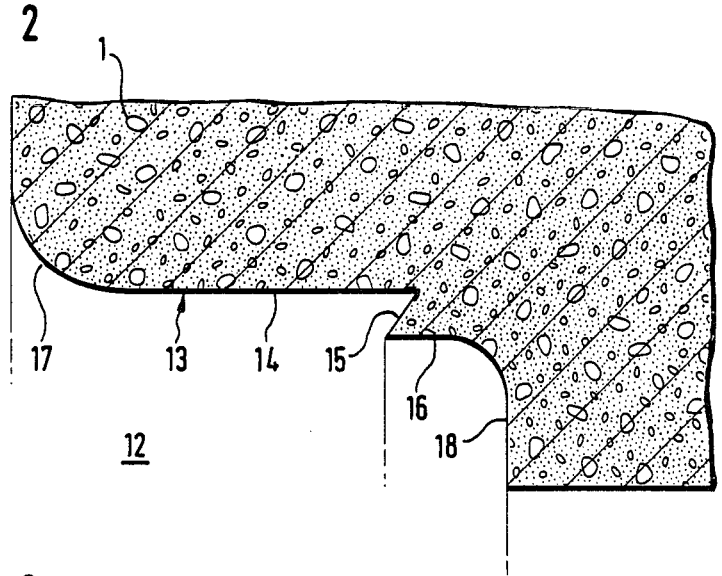
FIG. 2 is a sectional view of the bell-end of a concrete pipe (enlarged view)

The bell-end contains an annular bell-chamber 12 (FIG. 2) for accommodating the spigot 2. The bell-chamber widens radially by virtue of recess 13. Recess 13 has a cylindrical zone 14, an annular undercut abutment shoulder 15 and a lead-in-radius or -chamfer 17. The bell chamber 12 is bounded by an inner surface 16 located between radial shoulders 15 and 18, making way for the front face 8 of the spigot.

Figure 3:
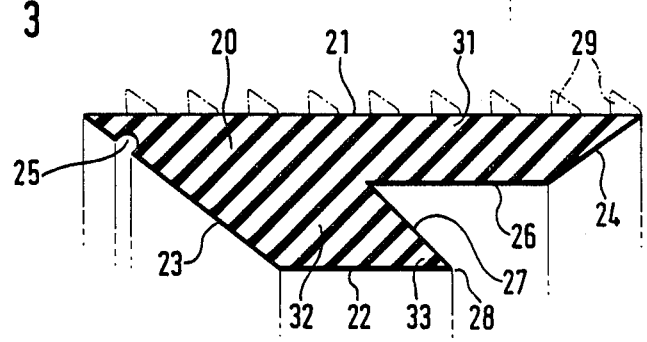
FIG. 3 is a cross-section of the seal (further enlarged)

FIG. 3 shows a transverse section of a seal 30. Its section resembles a trapezoid and constitutes an outer radial wide surface 21, an inner radial narrow surface 22, an axial outer tapered face 23 as well as an axial inner tapered face 24. The tapered face 23 contains a groove 25 close to its outer radial extremity for inserting a snap-ring. The tapered face 24 is interrupted by a transverse recess of triangular shape, the latter being bounded by surfaces 26 and 27. The boundary surface 26 nearly aligns with the inside surface 16, as opposed to boundary surface 27 which is inclined to produce a sharp edge, favourable for lip seals. Surface 21 may be provided with serrations 29 in order to improve retention of the seal 20 after mounting same in the recess 13, whilst assembling the spigot of the mating pipe. In order to secure this tight grip, seal 20 may have a slight interference fit in recess 13. A similar effect is achieved by the snap ring 35 inserted in groove 25, this could be a metal spring or a plastic retaining ring. A further possibility is to glue the (flat finished) surface 21 to surface 14 in order to secure a tight grip of the seat 20 in the bell 1.

The trapezoidal portion of the transverse section between the surfaces 21, 23, 24, 26 represents the retaining part 31 of the seal and the portion shaped like a parallelogram between surfaces 22, 23 and 27 the actual sealing part 32, functioning as a combined compression and lip seal.

Figure 4:
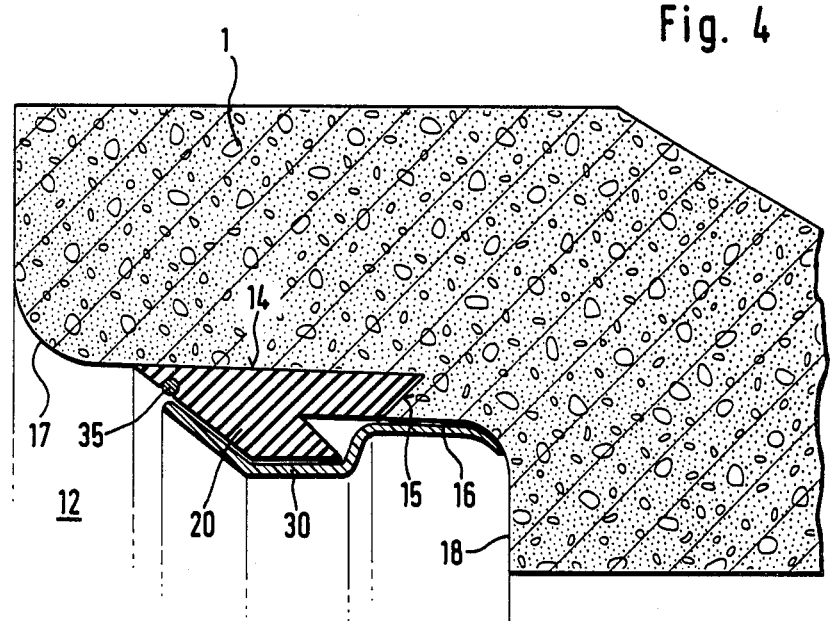
FIG. 4 shows a seal mounted in a bell-end and covered with a protecting strip.

FIG. 4 shows a cover 30 intended to protect the seal 20. The cover 30 consists of an extruded plastic profile, contacting surfaces 16 and 18 of the bell and surfaces 23 and 23 of the seal. The profiled strip 30 is rounded to form a ring, of which the ends might overlap slightly. The profiled strip 30 is removed prior to assembling the pipes.

Figure 5:
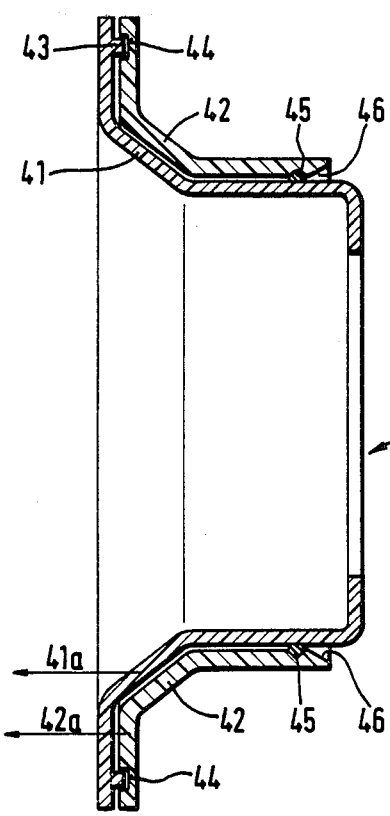
FIG. 5 shows a bell-forming core (decreased scale)

FIG. 5 shows a bell-forming core 40 for moulding the inside contour of the bell 1 and consists of a first section 41, the so-called base-ring for roll-in joints, and a second section 42 representing the forming ring to mould the recess 13. The sections or items 41 and 42 represent a separable unit, e.g. after removal of item 42, item 41 can be used for producing conventional bells as used for roll-in joints. Items 41 and 42 are detachably fastened together by means of a ring 43 attached to item 41 and a groove 44 machined in item 42 to act as a locating device. A gap seal 45 prevents the ingress of concrete slurry into the gap between items 41 and 42 thus preventing them from sticking together. As can be seen, item 42 is provided with an annular inclined face 46 to mould the inclined face 15 in the bell 1. The angle of the inclined face 46 is not of great importance, however, it should be less than 90° in order to provide a sufficient hold for seal 20 in the bottom of the groove 14. Angles within a range 60° to 45° would be preferable. The incline of surface 15 retains the seal in its proper position when the spigot is being pushed in, exerting an axial force on the seal.

The sealing area 32 of the seal 20 relative to the spigot surface 2 comprises the compression area 22 and the sealing edge 28 of the lip 33 enabling the dual function of a compression as well as a lip-type seal. Thus the sealing area 32 in FIG. 3 exhibits the features of a lip seal as well as those of a compression seal. Naturally, the sealing area 32 can also be composed of individual lip-type seals.

The material of the seal consists of an elastomer of a rubber-like consistency. The material is somewhat compressible, enabling it to be inserted into the recess 13 in a slightly compressed condition, allowing it to expand into cavities or similar surface irregularities to maintain effective sealing properties. This also applies to the serrations 29 (FIG. 3).

When the pressure builds up inside the completed pipeline, the lip 33 becomes pressurized and increasingly forced against surface 4 of the spigot. An optimum effect is achieved with a lip angle 27 ranging between 45°±10°.

Occasionally manufactured concrete pipes are subject to trend deviations, i.e. all of them slightly exceed the upper and lower limits. In such a case a set of odd-sized seals 20 is provided containing seals of nominal size as well as oversized or undersized specimen. Therefore, individually adapted seals with deviating dimensions may be selected and fitted. The cylindrical surface 14 facilitates determining the correct size of the seal to be fitted in each case. In practice, the concrete pipe manufacturer will order the corresponding quantity of appropriately sized seals from the seal producer.

Figure 6:
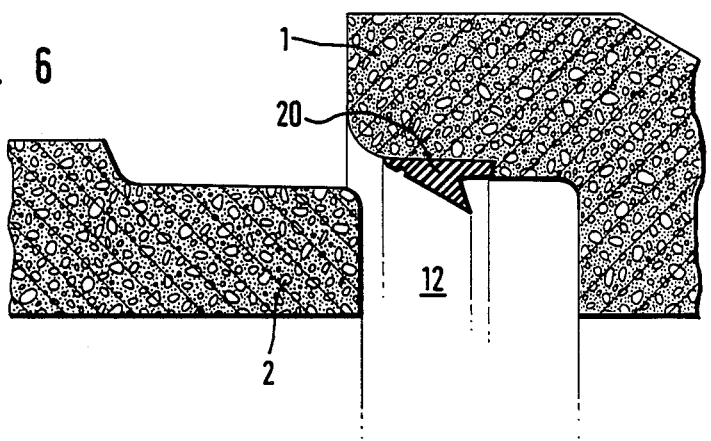
FIGS. 6 to 8 show the assembly procedure for pushing a spigot-end into a concrete bell-end pipe furnished with a sliding seal.
Figure 7:
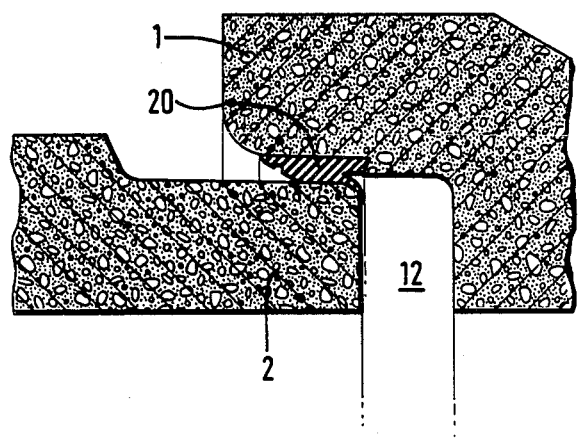
Figure 8:
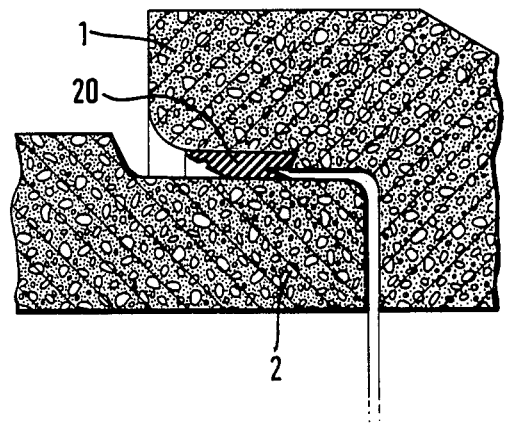

FIGS. 6 to 8 show the operating sequence for laying pipes. In the operational example shown, seal 20 appears to be designed primarily as a lip seal, however, during assembly it becomes increasingly compressed as illustrated in FIGS. 7 and 8, so that its compression function is also fully exploited.

Figure 9:
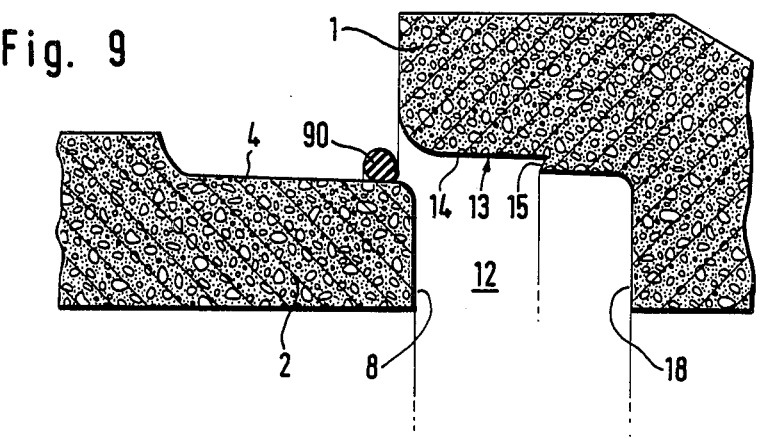
FIGS. 9 to 11 show the corresponding procedure applicable to roll-in rings.
Figure 10:
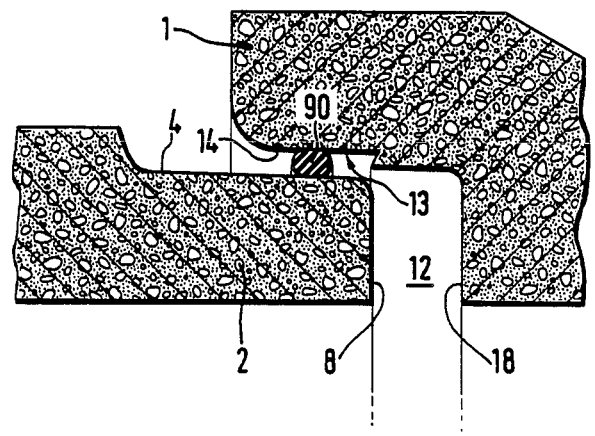
Figure 11:
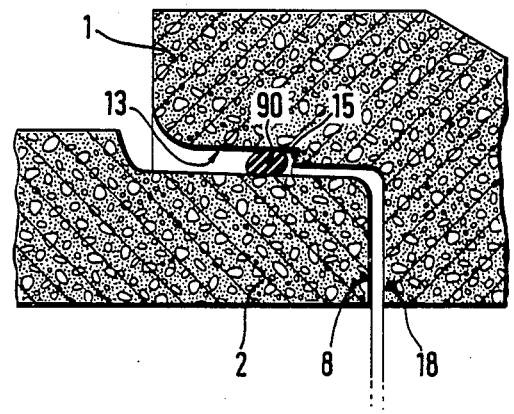

FIGS. 9 to 11 illustrate that a roll-in ring 90 can also be used instead of a sliding seal, the former is mounted on the periphery 4 of the spigot 2. When entering the spigot 2 into the bell 1 the roll-in ring 90 rolls along both surface 4 of spigot 2 as well as surface 14 of bell 1 until it finally reaches the middle of surface 4 as depicted in FIG. 11. During this process the roll-in ring is flattened slightly owing to the small height of the recess. The existence of shoulder 15 prevents the roll-in ring or parts thereof getting into the gap between the transverse faces 8 and 18, as sometimes happens with pipe bells of conventional design.

Figure 12:
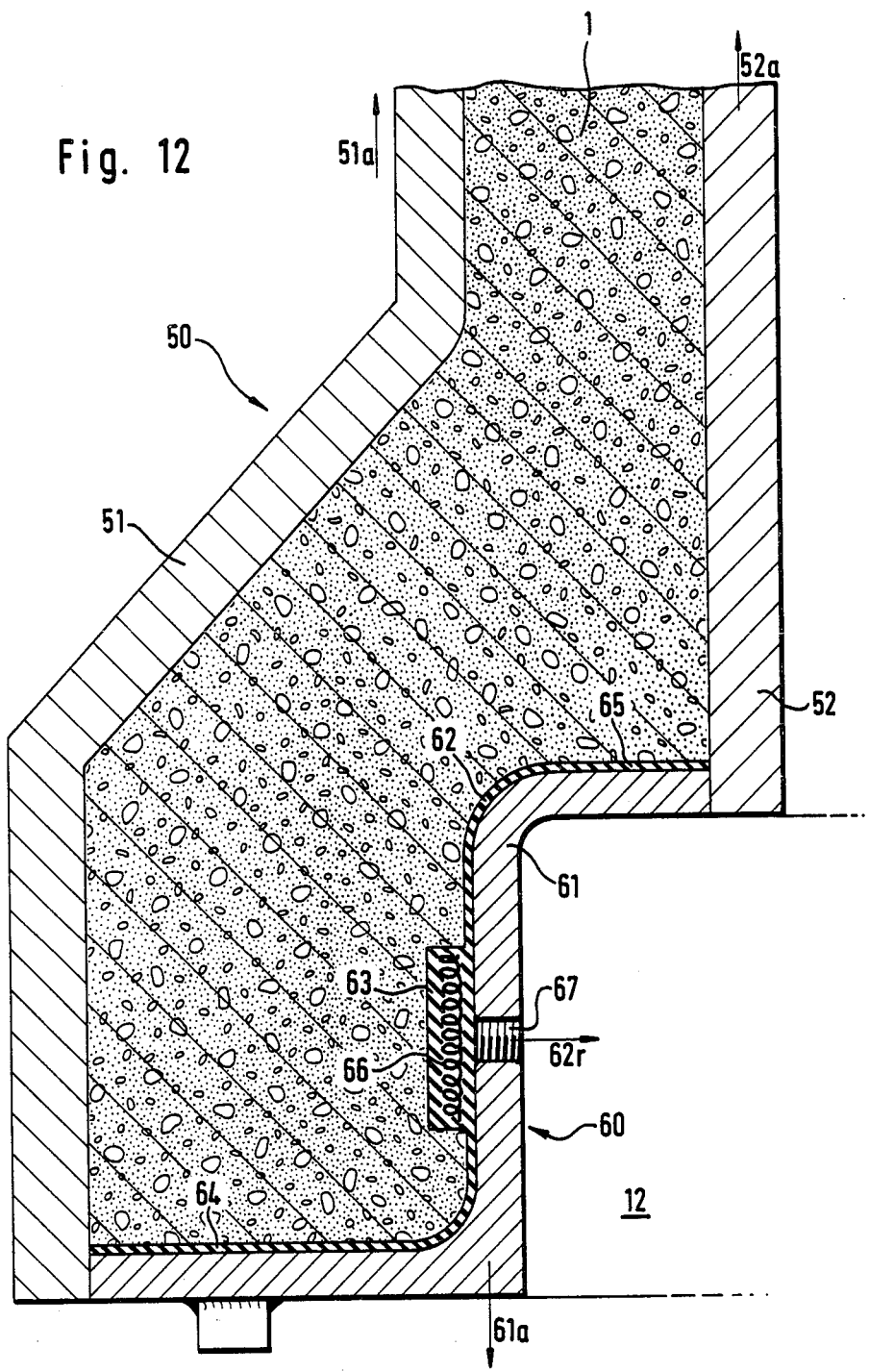
FIG. 12 is a part-sectional view of a mould used for casting concrete pipes depicting the area around the bell-end.
Figure 14:
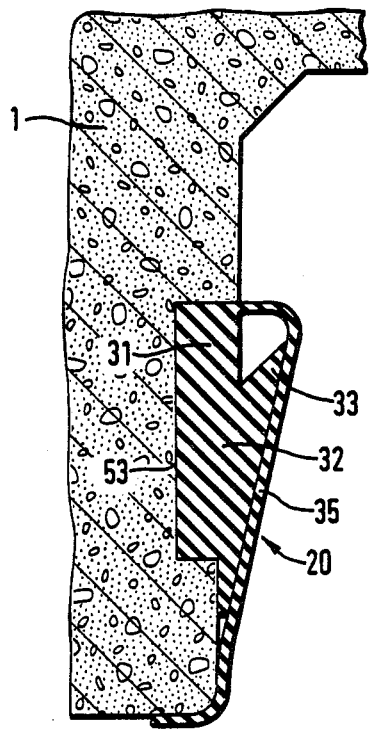
FIG. 14 is a cross-sectional view of a seal mounted in a bell-end.
Figure 15:
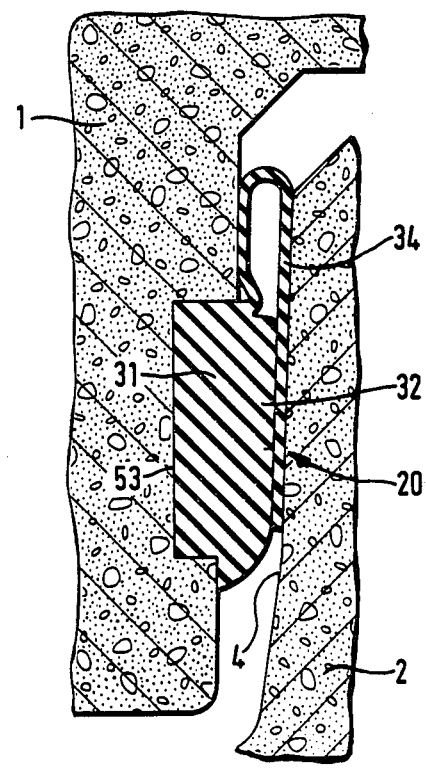
FIG. 15 is a cross-sectional view of a concrete pipe joint after assembly.

FIG. 12 shows the production of a concrete pipe with a fully charged mould 50 around the bell-end. Mould 50 comprises an outer tubular mould 51, a tubular core 52 and a bell-forming core 60 with its two segments 61 and 62, only one half being shown, the complete core 60 being similar to core 40. (FIG. 5 shows the complete bell-forming core 40 which is offset by 90° to its position in use.) FIG. 12 is a restricted view of a corner, parts 51 and 52 are actually much higher than shown and must be regarded as part of the pipe bounding the inner and outer surfaces of the concrete pipe. Section 61 serves to form the bell-chamber 12, whilst section 62 is intended to mould the recess or groove 53 (FIGS. 14, 15). During the concrete pipe finishing process the bell-forming core 60 represents the base of the mould 50 so that the concrete fed into the mould first forms the bell-end. Thus the casting takes place with the pipe standing on the bell-end 1. When the green concrete solidity phase is reached, at which point the concrete supports itself, the pipe is demoulded by removing the components parts in the following sequence and direction of the arrows shown: 52a, 51a, 61a and 62r.

In case of bell-forming core 40 per FIG. 5, all parts of mould 50 are demoulded in axial direction as indicated by arrows 41a, 42a. The sections 41 and 42 preferably stay together.

When a rectangular groove 53 (FIGS. 14, 15) is required, generating an annular chamber, demoulding in axial direction is not possible and therefore groove 53 has to be demoulded in radial direction as indicated with arrow 62r in FIG. 12. Since the bell-chamber 12 narrows inwards, section 62 cannot be made from a solid material. Preferably rubber material should be used for section 62. Section 62 may comprise one or several segments as a seal seat mould body 63 for moulding the seal seat groove 53. These are flanked with wing-like parts 64 and 65 all of which completely cover the surface of section 61. The seal seat mould 63 can be furnished with a vulcanized flat stiffening spring. An air-vent hole 67 is provided in section 61, through which compressed air or some other fluid may be forced whilst separating part 62 from part 61 to ensure careful demoulding.

The critical demoulding of the seal seat groove 53 is the last step to be taken, the wings are carefully removed from the concrete. By taking advantage of the elastic properties of rubber, wing 64 is doubled-in first. After that the complete seal-seat mould is carefully pulled out of the concrete.

To Facilitate the demoulding, section 62 may be composed of several pieces which, when put together on surface 61, completely cover and line this section.

Figure 13:
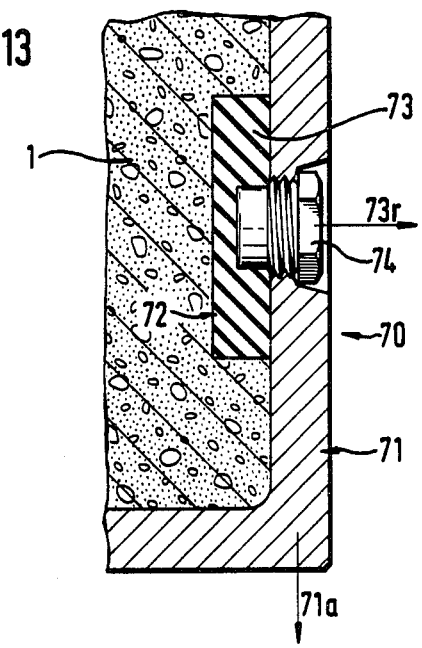
FIG. 13 is a part-sectional view of a modified detail as an alternative to FIG. 12.

FIG. 13 elucidates a further design 70 of a bell-forming core, its two sections are designated 71 and 72. Shape and material of section 71 correspond with section 61, whereas section 72 consists of several segments and 73 of rubber, all of which are losely connected to section 71 with a screw 74 or some other easily detachable connection, when the concrete pipe is being cast. When the pipe is ready for demoulding, the same procedure is adopted as described in connection with FIG. 12. However, before withdrawing the bell-forming core 70, screw 74 must be removed and subsequently section 71 of the bell-forming core can be removed in axial direction, i.e. in direction of arrow 71a. After that the various segments of the seal-seat-mould are extracted from the concrete in radial direction, as indicated with arrow 73r.

FIG. 14 shows a sliding seal 20 having a seating or holding portion 31 and a sealing portion 32. The seating portion 31 is located within an annular recess or groove 53 of essentially rectangular cross-section. The sealing portion 32 contains a lip 33 and is covered with a thin flap 34 to protect the sealing portion 32.

FIG. 15 shows a sliding seal 20, of which the retaining part 31 is seated in the rectangular groove 53 already described and the sealing portion 32 protrudes into the gap between the bell-end 1 and the spigot 2. Seal 20 is covered with a thin flap 34, initially adopting shape 34 as shown in FIG. 14. When assembling bell-end and spigot-end, flap 34 is drawn into bell-and-spigot joint as illustrated in FIG. 15. In that position it serves as a lining on surface 4 of spigot 2. This kind of a joint permits reciprocal motion between parts 1 and 2 without abrading the seal.

What is claimed is:

1. A concrete pipe comprising
   a bell end and a spigot end, said bell end containing an annular chamber for accommodating said spigot end;
   a seal; said seal having a seating portion and a sealing portion;
   said sealing portion having an annular recess of triangular cross section in said sealing portion before being pressed together;
   said annular chamber having a radial recess which is relatively shallow and formed with shoulder means for receiving and supporting said sealing portion of said seal after said concrete pipe has hardened;
   said radial recess including shoulder means for supporting said seating portion of said seal when being inserted, thereby forming a relatively compact body functioning as a combined compression and lip seal.

2. The concrete pipe set forth in claim 1 wherein said bell end has a front surface which merges into said recess, wherein said recess has a cylindrical surface and wherein said shoulder means comprises an annular undercut abutment shoulder.

3. The concrete pipe set forth in claim 1 wherein said recess comprises an annular groove and wherein said shoulder means comprises two radially extending shoulders spaced from one another.

4. The concrete pipe set forth in claim 2 wherein said seating portion of said seal is of trapezoid cross-section.

5. The concrete pipe set forth in claim 3 wherein said seating portion of said seal is of rectangular cross-section.

6. The concrete pipe set forth in claim 1 wherein said seal comprises a cover to protect the sealing portion against mud and damages.

7. The concrete pipe set forth in claim 6 wherein said cover comprises a plastic profile and is removable supported on said sealing portion of said seal.

8. The concrete pipe set forth in claim 6 wherein said cover comprises a flap slideably supported on said sealing portion of said seal.

* * * * *